H. L. DE ZENG.
OPHTHALMOLOGICAL INSTRUMENT.
APPLICATION FILED MAY 5, 1919.
1,409,680.
Patented Mar. 14, 1922.
4 SHEETS—SHEET 1.
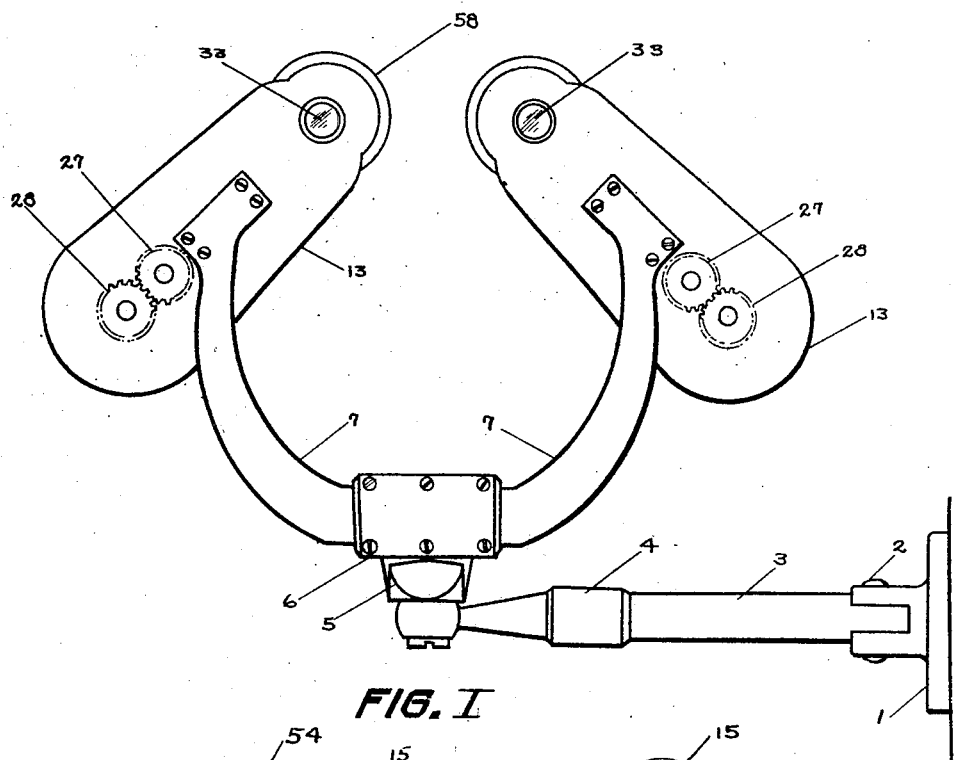
FIG. I.
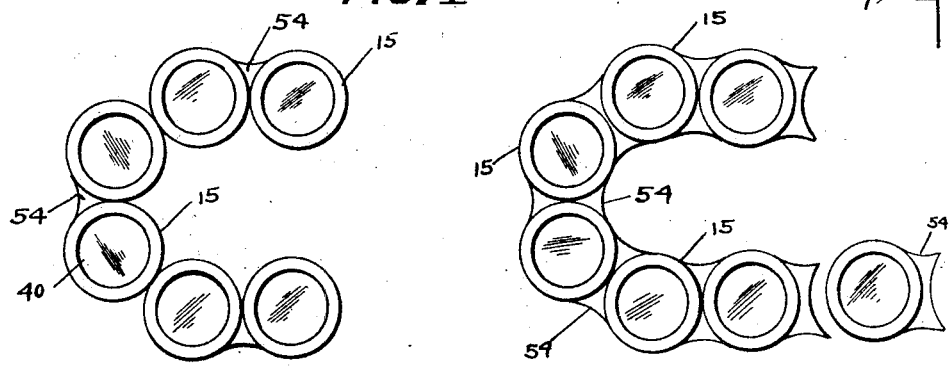
FIG. VIII.    FIG. IX.
INVENTOR
*H. L. DEZENG*
BY
*H. H. Styll   H. K. Parsons*
ATTORNEYS H. L. DE ZENG.
OPHTHALMOLOGICAL INSTRUMENT.
APPLICATION FILED MAY 5, 1919.
1,409,680.
Patented Mar. 14, 1922.
4 SHEETS—SHEET 2.
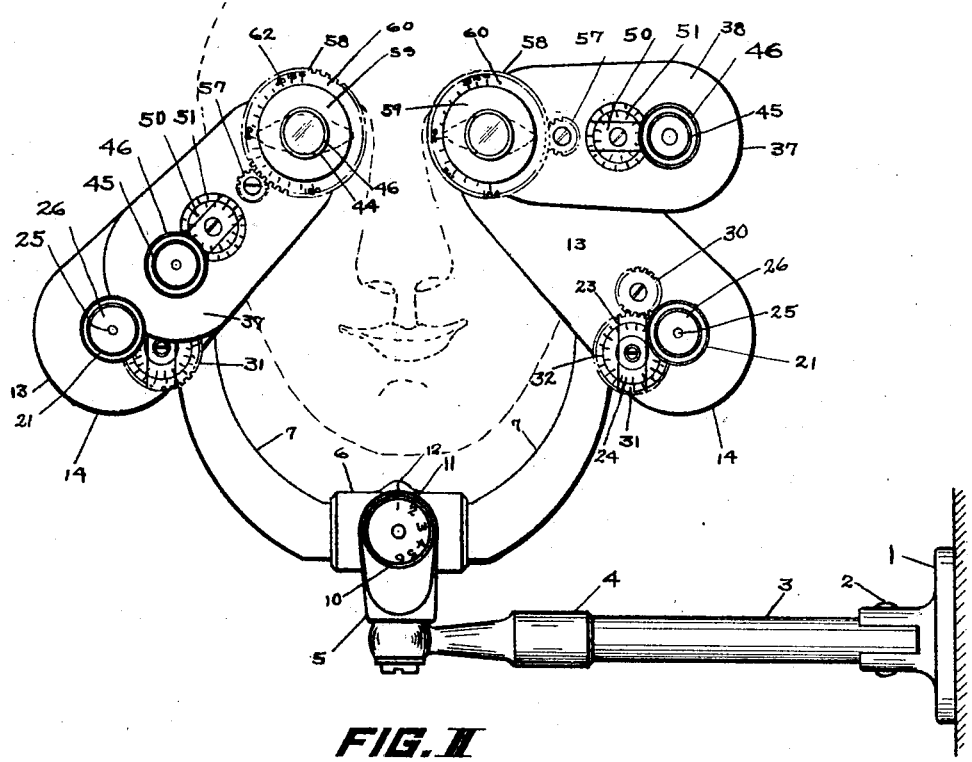
FIG. IX
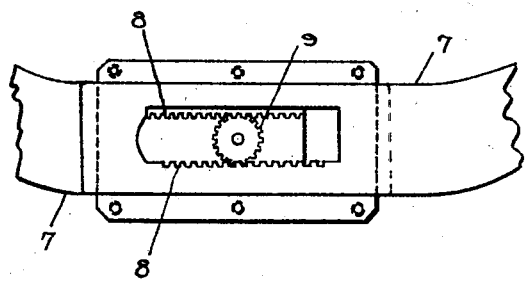
FIG. X
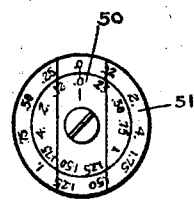
FIG. XI
INVENTOR
*H. L. DE ZENG*
BY
*H. H. Styll  A. K. Parsons*
ATTORNEYS

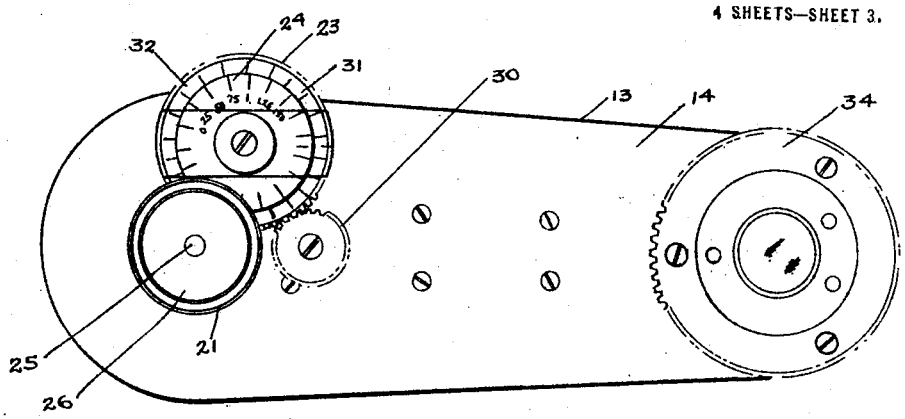
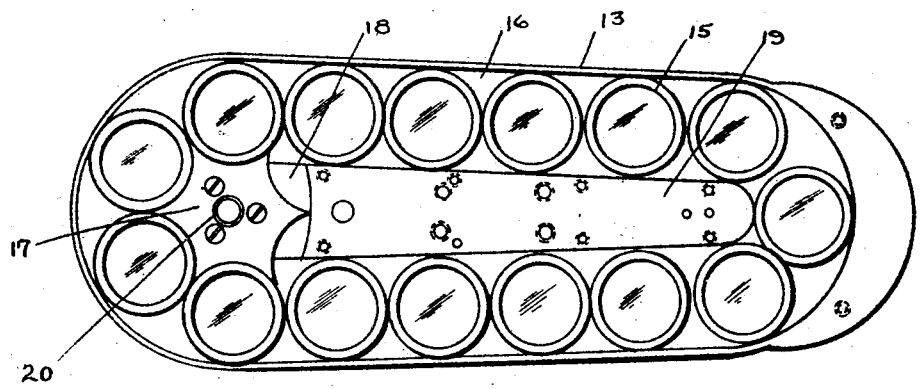
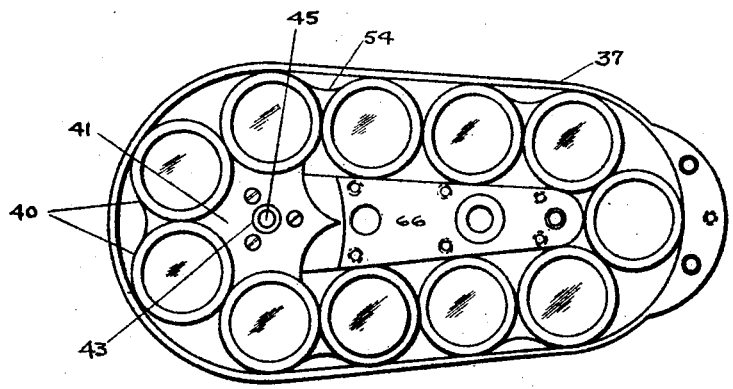

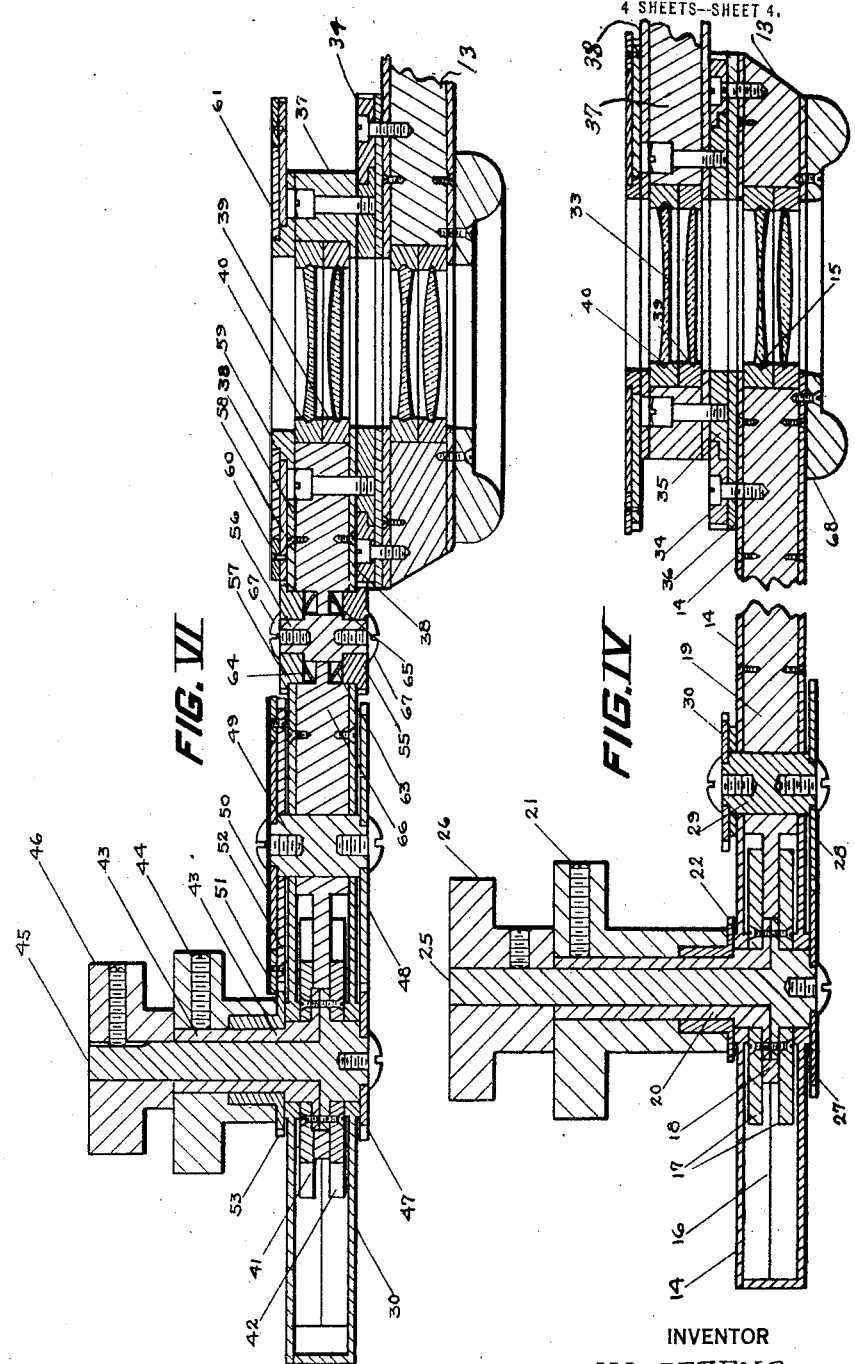

UNITED STATES PATENT OFFICE.

HENRY L. DE ZENG, OF MOORESTOWN, NEW JERSEY.

OPHTHALMOLOGICAL INSTRUMENT.

1,409,680.      Specification of Letters Patent.     Patented Mar. 14, 1922.

Application filed May 5, 1919. Serial No. 294,754.

*To all whom it may concern:*

Be it known that I, HENRY L. DE ZENG, a citizen of the United States, residing at Moorestown, in the county of Burlington and State of New Jersey, have invented certain new and useful Improvements in Ophthalmological Instruments, of which the following is a specification.

This invention relates to improvements in ophthalmological instruments and has particular reference to an improved form of instrument for use in determination of the lens values necessary to properly correct defective or imperfect vision of various individuals.

One of the leading objects of the present invention is the provision of an instrument of this character which shall be small, neat and sanitary, which shall cover a minimum portion of the face of the patient being tested, and which may be readily adjusted to conform to various facial requirements, and shall permit of quick and ready positioning of various test lenses before the eye of the patient.

Another object of the present invention is the provision of a novel and compact instrument in which the lenses shall be secured in improved type of dust-proof case, to at all times preserve the lenses in the best possible condition for testing, and in which a series of lenses may if desired be placed before the eye of the patient in close relationship one to the other, whereby the effect of the total combination thus presented will be approximately the same as the indicated values of the several lenses forming the combination, and variance in power due to separation of the lenses will be reduced to a minimum.

A further object of the present invention is the provision of a novel and improved form of testing instrument, in which a large train of lenses of cylindrical value may be readily positioned before the eye of the patient, and in which the axes of all of the cylinder lenses adapted to be placed before one eye of the patient may be simultaneously correspondingly shifted so that the several lenses as moved into operative position will each be presented with its axis in the same relationship to the eye.

A further object of the invention consists in so mounting the various lenses in the several series making up my completed instrument, that by combining selective lenses from the several series any desired power and variance in power of lenses may be readily secured for testing purposes, while at the same time the total number of lenses and thus the bulk of the instrument as an entirety is reduced to the lowest practicable minimum.

Further objects and advantages of my improved instrument include the simplification of parts and the various structural features and details by which the foregoing advantageous results may be accomplished in a practicable manner, and should be apparent from the following specification taken in connection with the accompanying drawings, but it will be understood that I may make any modifications in the specific details of construction shown and described within the scope of the appended claims without departing from or exceeding the spirit of my invention.

Figure I represents a view of my complete instrument from the rear side or side adapted to face the patient.

Figure II represents a view of the instrument from the operator's side, the position of the patient in the rear of the instrument being indicated in dotted lines.

Figure III represents an enlarged plan view of one of the dust-proof lens cases, the one here illustrated being the one employed in connection with the spherical lens series.

Figure IV represents a longitudinal sectional view of the case in question and parts carried thereby.

Figure V represents a plan view of the interior of this case, the top or cover plate being removed.

Figure VI represents a longitudinal sectional view of the cylindrical case.

Figure VII represents a plan view thereof with cover removed.

Figure VIII represents a detailed view of certain of the lens cells.

Figure IX represents a detail view of a different form of lens cell.

Figure X represents a fragmentary sectional view of the pupillary distance controlling mechanism.

Figure XI represents an enlarged detailed view of one of the double indicators.

In the drawings, in which similar characters of reference are employed to denote corresponding parts throughout the several views, the numeral 1 designates a wall bracket having hinged to it at 2, the arm 3, fitted into the joint member 4 of my instrument, to which is swivelled the main supporting bracket 5. This bracket 5 includes a sleeve or guide block 6 receiving the lower ends of the arms 7, which support the lens cases. These arms are provided, as indicated in Figure X, with the rack teeth 8, one set being at the top on one arm, and the other set being at the bottom of the other arm, while a common pinion 9 meshes with the two racks and is operable by the knurled head 10 to move the arms in and out and thus vary the pupillary distance of the instrument. If desired, graduations 11 may be provided on the head 10, cooperating with the pointer 12 on the bracket 6 to indicate the interpupillary distance to which the instrument is adjusted.

As the parts carried by the two arms 7 are ordinarily duplicates, one of the other, designed for use one before each eye, a description of one side only of the instrument should suffice for a clear understanding thereof.

Secured to the upper end of the arm 7 and extending diagonally upward and inward therefrom is a main lens case 13, shown in section in Figure IV, and provided with a cover plate 14, the parts being suitably united as by screws or the like, to form a dust-proof container for the test lenses. In ordinary use the case 13 is designed to receive the spherical testing lenses, which lenses are mounted in the circular cells 15 disposed in the race-way 16, formed within the case 13. In this connection it is to be noted that the height of the case 13 is double the thickness of the cells 15, and that the cells are disposed in the race-way in a double layer or series resting directly against each other.

It is to be noted that the case is somewhat ovate in form, and near the more pointed end is provided with a sight aperture. The lenses in the race-way pass beneath the aperture, and when directly alined with the aperture are in operative position. To cause the various lenses in each series to be independently shifted and moved into position within the race-way, I make use of what may be termed star wheels 17, which are disposed one each side of the bearing plate 18, forming a part of the inner wall 19 of the race-way. These star wheels are so notched as to form a sprocket fitting within the several adjacent cells 15 and thus feeding around the cells so engaged, while as the entire series of cells in the race-way are in contact one with the other this feeding movement will cause the cells to pass around the race-way and to be successively presented in operative position.

As should be understood by reference to Figure IV, the upper star wheel 17 is carried on the sleeve 20, which projects above the cover 14 and has secured on its upper end the thumb wheel 21, by rotation of which the various lenses may be shifted, this wheel 21 having at its lower end adjacent the cover 14, the pinion 22, which meshes with the teeth of the indicator wheel 23, having a central upstanding dial portion 24. Similarly, the lower star wheel controlling the bottom set of cells shown in Figure IV, is carried by the spindle 25 which extends upwardly through the sleeve 20, and has on its upper end the operating knurled thumb wheel 26. This spindle, however, also extends through the case 13 and is provided on its lower end with the pinion 27, meshing with a second pinion 28 on the stud shaft 29, which has on its upper end the third pinion 30, which meshes with a dial ring 31 loosely resting on the gear 23 and surrounding its indicator portion 24. This outer dial ring bears suitable configurations to denote the value of the several lenses in the lower train, while the central dial indicates those of the upper train, a semi-open or transparent retaining device 32 serving to secure the parts together, and having an indicating line with which the selected configurations register as their corresponding lenses are brought into position beneath the sight aperture of the case.

Particular attention is here invited to the lenses which are contained in each series, and it will be seen, for example, in the series shown in Figure IV, that the set in the lower race-way may as an entirety be negative lenses, while the upper series are positive lenses. It is, of course, desired, however, to secure maximum range for the instrument, and for the accomplishment of this result it will be seen that the negative series, for example, runs from zero to 2.75, by quarter dioptres, and in addition possesses three positive lenses whose values are respectively $+.12$, $+3$. and $+6$. Similarly, the upper series, or positive lenses, extends from $+.25$ to $+2.75$ by quarter dioptres, and in addition is provided with negative lenses, respectively, $-.12$, $-3.$, and $-6$. It will, therefore, be seen that in testing the eye the regular spherical series will carry it in either $+$ or $-$ from a quarter dioptre to a 2.75. If an eighth dioptre is desired it is merely necessary to place the eighth in the opposite set under the sight aperture, when an eighth will be added to the power of the first race-way. Similarly, when 2.75 has been reached, the next quarter is obtained by returning the one set to zero and moving the 3 on the opposite set into position. Variations from 3 to 5.75 may then be accomplished by operating the first used series around to the 2.75 point once more. When it is desired to go above this it is merely necessary to change from the 3 to 6, so that the total range of the instrument thus provided and which may be contained within a space of about six inches in length by a trifle over two inches in width, gives a testing range in the spherical powers of from a $-8.75$ to a $+8.75$, or of seventeen and one-half dioptres.

Attention is here also particularly invited to the fact that the lenses employed in the cells while of entirely sufficient size for all satisfactory testing purposes, are of relatively small diameter and are so positioned in the contacting cells as to be as nearly as possible in engagement one with the other, so that variations due to separation of the lenses are reduced to a minimum. It will be understood, however, that it is desirable in the testing of the eye to determine the cylindrical corrections, if any, as well as the spherical. In the accomplishment of this result I make use of a second case permanently secured to the first, and bearing the necessary cylindrical series. It will be understood that it is, of course, necessary that the cylindrical lenses also be viewed through the sight aperture 33 of the main cases. To facilitate this result without in anywise interfering with the vision or movement of the lenses beneath the aperture, I secure to the cover 14 the ring gear 34, disposed concentric with the aperture 33, while countersunk into the under face of this gear is the retaining or swivelling flange 35 of the bearing ring 36, which is secured to the under side of the second or cylinder case 37, illustrated in Figures IV and VI.

It will thus be seen that through the interengagement of the swivel ring on the cylinder case, and the gear on the spherical case, the two cases are united for swivelling action about the sight aperture as a center, so that they may be placed at any desired relative angle without interfering with vision through the sight aperture, and the lenses of the race-ways of the two cases may be selectively brought into operative alinement one with the other, as desired. To accomplish these results the case 37 is provided with the dust-proof cover portion 38 suitably secured to the part 37, and providing the race-ways for the negative series of cylindrical lens cells 39 and the upper positive series 40. To shift the lenses around in the race-ways there is provided, as in the other series, the pair of star wheels or sprockets 41 and 42, the sprocket 41 being on the sleeve 43 which projects and is engaged by the thumb nut 44, while the sprocket 42 is on the spindle 45, having at its outer end beyond the thumb nut 44 the operating thumb nut 46, and having its other end projecting from the inside of the casing and receiving the pinion 47 in mesh with the transfer gear 48, which through the spindle 49 extending upward through the casing, engages the upper indicator or dial 50, while surrounding the dial 50 is the second dial 51 carried by the gear wheel 52 loosely mounted on the spindle 49 beneath the dial 50 and in mesh with the pinion teeth 53 of the sleeve 43.

It will thus be seen that the two dials are operated with their respective star wheel sprockets upon rotation of the proper thumb nuts to indicate the particular lenses which are brought into operative position in the instrument. In the case of the cylindrical lenses so great a range of power is not ordinarily required and, therefore, I am able to make use of fewer cylindrical lenses but arrange them in the same type of series as previously, that is to say, the cylinder set if desired may run from $+.25$ to $+1.75$ in the one series and from $-.25$ to $-1.75$ in the other series, in addition to which I introduce in the $+$ series a $-.12$, $-2$, and $-4$ cylinders, and into the minus series a $+.12$, $+2$, and $+4$ cylinder, which it will be understood may be used in combination with the opposite series, so that by the use of my improved lens case and my novel and improved series mounted therein it is possible to get any cylinder from a $-5.75$ to a $+5.75$, and at the same time the entire group of lenses will be contained in extremely small space.

It will be appreciated, however, that in the case of testing with cylindrical lenses the matter of axis is of extreme importance and may not be disregarded, as is the case with sperical lenses, in which the rotation of the cell is of no importance. It is, therefore, necessary and certain of the essential features of my improvement consist in the peculiar mechanism by which I am able first to set the lens case and cylinder lens, which may be in operative position, at any desired axis, and second, that on account of my improved construction the positioning of any particular lens at a certain axis will, on account of the novel and improved manner in which my lenses are assembled within the cells, cause each lens as it is brought in operative position to have its axis in the same relative position to the eye of the patient that the first lens was set, while a further novel and important feature of my invention is the simple but efficient manner in which I so secure the lenses within the cylinder case that while they are all free to move around within the case, to the end that any desired lens may be brought into operative position, they are at the same time, while assuming the sliding movement in the case, so held that when in operative position the axis of each will occupy a predetermined relation to the containing case. As the simultaneous angling of all of the lenses and the determination of this angle is primarily and absolutely dependent on the shifting of the lens cells about in their race-ways in such manner that the cylinder axis in operative position will always bear a predetermined relation to the lens case, I will first describe the mechanism by which this is accomplished.

It will be noted by reference to Figure VII that the case 37 contains an odd number of lenses so that when one lens is in operative position at the narrow end of the ellipse there will be a pair of lenses at the opposite end, it having been found that by this provision there is much less tendency for the lens cells to cramp than is the case when a circular or other regular form track or race-way is employed, or when an even number of lens cells in place of an odd is employed. It will further be noted by reference to this figure that the lens cells are secured together rigidly, as by soldering, in pairs, while the odd cell is open so that when in position it will simply give a space to be looked through. This securing together of the cells can also be very clearly understood by reference to Figure VIII, in which three pairs are shown detached, from which it will be seen that the two are secured in axial alinement one with the other, but preferably attached only at their outer portions, leaving the center free to best engage the shifting sprocket or star wheel. The result accomplished by this securing together of the two parts is that the pair will travel around as a unit within the race-way at all points. On account of their central rigid attachment the two cells will together slide and bend around thet narrowest point of the race-way, where one cell is brought into operative position, will satisfactorily move along the substantially straight sides of the race-way or curve around without the slightest tendency to stick or bind, while at the same time this connecting together of the pair will insure the one of the pair brought into operative position always being in certain relationship to the race-way, so that when a cylindrical lens is mounted therein the axis of the lens will always be in predetermined relation to the lens case when at that point, this relationship being a constant and unvarying one, although existing for that one particular point only. Similarly, as the first lens of the pair is carried beyond the point at which it is used, and the second lens brought into position it will occupy a certain predetermined relation and by properly mounting the several cylindrical lenses within their several cells, all of the lenses of the entire case may be so arranged that their axes will all have the same identical relationship to the case as they are selectively moved into what has been termed operative or usable position.

It will, therefore, be seen that by the use of my novel and improved two member or double link lens cell the various lenses may be shifted around in the circular or other form of race-way, as desired, and yet their axes always be in predetermined position.

As an alternative construction, in place of the form shown in Figure VIII, in which the pair are permanently secured together, it is possible to have each cell separate from the next and connected or united therewith as by the arcuate wing members 54, the effect in this instance being the same as with the secured pair, since there is but one relationship which the cell may have to the lens case on account of the interlocking of the arcuate wing member 54 with the adjacent cell, and this relationship is a constant one irrespective of the oscillation or partial rotation of the adjacent cell since it is the holding of the two with their centers in axial alinement or other predetermined relation as fixed by the adjacent cell and its position in the race-way which determines or fixes the position of the operative lens.

From the foregoing it will be seen that by the use of my improved manner of controlling the cell being used by its relationship to the race-way and adjacent lens cell, I have provided a construction in which the lens cells may be shifted as desired and caused to follow any desired shape of track or race-way but always be in predetermined relation to the enclosing case when brought into their operative position. This result having been accomplished it will be understood that to vary the axes of the several cylindrical lenses being employed in testing purposes, it is necessary only to vary the angular relationship of the case carrying these several lenses to the eye of the patient, which result is easy of accomplishment on account of the swivel connection between the case 13 rigidly secured to the supporting arm 7 and the second or supplemental case 37, and it will be understood that if the case be angled about its swivel with any particular lens before the eye, all other lenses if used will appear before the eye at that particular selected angle. It is particularly desirable, however, that the case and lenses be locked at the particular angle required, that they be capable of rotation through an arc of 180 degrees, and that the particular angle or axis at which they are located may be readily determined.

By my improved mechanism I have correlated the several features just referred to, to the end that the mechanism for locking forms a part of the mechanism for indicating the angle of axis, while the mounting of the case 37 on the outer face of the case 13, away from the patient, together with the position of the controlling thumb nuts 21 and 26 on the main cases, make it possible to swing the entire cylinder lens case from a position approximately against the nose to a position on the forehead, or, in other words, through the desired arc. To indicate and lock the case at the desired angle I have, as has been previously mentioned, secured to the top of the case 14 the heavy gear 34, while in mesh with this gear is a pinion 55 keyed on a rotatable shaft 56 extending through the case 37 and bearing keyed to its other end a second pinion 57 in mesh with the ring gear 58, rotatably mounted on the hub or peripheral flange 59 on the cap 38.

The mechanism just described forms a type of planetary gearing, the two gears having the same number of teeth and the two pinions the same number of teeth, the result being that since the gear 34 is rigidly secured to the rigidly held case 13, as the supplemental or cylinder case 37 is swung on its swivel the pinion 55 will run around the stationary gear 34 driving the shaft 56 and causing the pinion 57 to rotate the gear 58 in the opposite direction to that in which the case 37 is being swung so that as a practical proposition the gear 58 will be held stationary while the case is shifted. This feature I make use of by securing the protractor dial ring 60 to the upper face of the gear 58, while within it I secure on the flange 59 the retaining ring 61 provided with axis designating lines 62, corresponding in position with the position occupied by the axis of the cylinder lenses in the case 37 when positioned at the sight opening. Therefore, by swinging of the case 37 about the line of sight, these designations 62 will show the axis in degrees of the cylinder lenses positioned at the sight opening which may be read from the protractor 60 according to the point on the protractor at which the designation 62 registers. In order that the parts may be freely shifted to desired axis, but will remain fixed in such position, I mount on the shaft 56 the pair of friction washers 63 and 64, which bear against the interposed partition wall 65 of the block 66, or inner wall of the race-way for the lens cells, the pinions having collars tightened against these friction washers, as by the screws 67 which hold the pinions on the shaft 56, and a friction thus being provided tending to retard the rotation of the shaft 56 to the desired amount to frictionally secure the cylinder case in desired angularly adjusted relation to the spherical case.

From the foregoing description taken in connection with the accompanying drawings the construction and method of use of my improved ophthalmological instrument should be readily apparent, and it will be seen that it can be readily secured in position on the wall, from whence it can be swung upward in position for use. When in use the patient sits at one side bringing the face to the face engaging rings or members 68, when the operator on the opposite side adjusts the instrument to the exact inter-pupillary distance of the patient, which inter-pupillary distance may be determined through use of the scale 11. The outward flaring of the supporting arms and inward angular extending of the main cases cause the sight apertures to be brought immediately in front of the eyes in proper position for use, while sufficiently large space is centrally provided so that the nose and mouth of the patient are in no way interfered with or hampered, making it much pleasanter for the patient as well as avoiding the possibility of spread of contagion through successive patients breathing on or toward the same fixed parts of the instrument, and thus rendering this instrument more sanitary than previous ones. The patient then being in proper position before the instrument, rotation of the thumb nuts 21 and 26 serve to present the desired positive or negative spherical lenses before the eye of the patient until the correct power has been obtained, while similarly rotation of the thumb nuts 44 and 46 serve to present the various cylinders and swivelling of the supplemental case 37 varies the axis of the cylinders until the entire necessary correction has been ascertained. To close up the instrument it is merely necessary to swing the supplemental cases 37 downward and rotate the various thumb nuts until the indications are at zero, when the dustproof cases protect the lenses and prevent the entrance of dust or the like thereto so that the instrument is in perfect condition and ready for use with the next patient.

Particular attention is invited to the oval as distinguished from elliptical or round shape of the cases for both the spherical and the cylindrical sets of lenses, as by actual trial and experiment these cases have been found to be much superior to any hitherto known type of case for travelling lens cells. Among the advantages of this particular type of case might be pointed out the fact that satisfactory travel of the cells within the case is impossible unless a large sprocket for imparting motion to the cells is employed, while with a case of equal width at both ends the size large enough to accommodate the sprocket at the outer end would be so large as to seriously interfere with the correct positioning of the lenses at the opposite end, in that the side of the case would have a tendency to strike against the nose or face of the patient and interfere with correct pupillary adjustment with the face of the patient immediately between the cases, as is the most desirable relation, since in this relation the lenses are more nearly in correct position before the eye of the wearer. Additionally, the possibility of using a large sprocket thus provided permits of much faster movement of the several lenses in shifting to get the necessary lens before the eye, and the more ready scaling or indication of the adjustment of the lenses.

I claim:

1. In an instrument of the character described, the combination with a supporting portion, of a pair of arms carried thereby and separated to lie outside the bounds of a patient's face, means for varying said separation, and lens holders carried by the arms and arranged with their upper portions converging towards each other, substantially as and for the purpose described.

2. In a device of the character described, a case with a race-way, a series of movable lens cells in the race-way, and connections between adjacent cells on one side only, the cells being free of each other on the other side, whereby the position of the individual cell at a predetermined point in the race-way will be controlled by its engagement with the adjacent cell.

3. An ophthalmological instrument, including a casing having a race-way and a sight opening, a series of links disposed in the race-way, each link comprising a pair of connected lens cells, cylindrical lenses mounted in said cells with their axes so placed therein that the axis of each lens will bear the same angular relation to the case when brought into operative position at said sight opening.

4. In an instrument of the character described, the combination with a stationary support, of a gear fixed to said support, a case adjustably attached to said support, a pinion carried by said case and meshing with said gear, and a friction attachment for holding said case in operative position with respect to said support.

5. In an ophthalmological instrument, the combination with a support and a swivelled lens case, of a fixed gear on the support, a loose gear on the case, and a shaft in the case bearing pinions intermeshing with said gears, whereby the said pinions restrained by the stationary gear will ride freely on and prevent rotation of the loose gear as the lens case is swung on its swivel.

6. In an ophthalmological instrument, the combination with a support and a swivelled lens case, of a fixed gear on the support, a loose gear on the case, a shaft in the case bearing pinions intermeshing with the gears, whereby the pinions restrained by the stationary gear will ride freely on and prevent rotation of the loose gear as the lens case is swung on its swivel, and a protractor on the loose gear for indicating the angle to which the case is swung.

7. An ophthalmological instrument, comprising a pair of divergent arms, spaced to admit the face supports carried by the arms having visual apertures, said supports converging in the direction of the apertures, and means for relatively adjusting the arms to position the visual apertures before the eyes of a patient.

8. In an instrument of the character described, the combination with main and supplemental lens cases each having a sight aperture forming a common axis, the supplemental lens case being swivelled about such axis, a series of spherical lenses in one of the cases adapted to be successively presented at the sight aperture, a series of cylindrical lenses in the other of said cases similarly adapted to function with said aperture, and means for holding the axes of the several cylindrical lenses constant when at said aperture.

9. A binocular eye testing instrument comprising a pair of supporting members provided at their adjacent portions with sight apertures, means for presenting a plurality of spherical lenses before each of the sight apertures, a supplemental support oscillatably secured to each of said members and extending outwardly thereover, said support being oscillatable about the sight aperture of the member as a center, and a plurality of cylindrical lenses carried by the oscillatable member whereby the axes of the entire set of cylinders may be simultaneously correspondingly varied by oscillation of the supplemental support.

10. A device of the character described, including a continuous race-way, a series of lens cells rotatable and slidable in the raceway, and means for turning each cell a given amount at a predetermined point in the race-way.

11. A device of the character described, including a continuous race-way, a series of lens cells in the race-way, means for moving said cells along said race-way, means for rotating each cell a given amount at a predetermined point in the race-way, and means exterior to the race-way for indicating the degree of rotation of the cells when located at said predetermined point in said race-way.

12. A device of the character described, including a continuous race-way, a series of lens cells rotatable and slidable in the raceway, means for turning each cell a given amount at a predetermined point in the race-way, means exterior to the race-way for indicating the position of a predetermined axis of the cell, a swivelled support for the race-way, and a stationary indicator cooperating with the first mentioned indicating means to facilitate determination of the position of the axis as varied by swivelling of the race-way.

13. An ophthalmological instrument for testing with cylindrical values, including a case having a race-way and an odd number of lens cells filling the race-way, the cells being joined in pairs, whereby the position of one member of the pair controls that of the other member of the pair, the paired cells being provided with cylindrical lenses, substantially as and for the purpose described.

14. An ophthalmological instrument, including a lens case having a sight aperture, a race-way in the case, and a series of lenses within the race-way adapted to be selectively positioned before the aperture, a second case swivelled with the aperture in the first as a center, a race-way in the second case, a sight aperture alined with the sight aperture in the first case, and cylindrical lenses in the race-way adapted to be successively brought into alinement with the apertures in the cases, the swivelling of the second case serving to vary the axis of the lens which it carries.

15. In a device of the character described, separated lens holders having sight apertures, one for each eye, and immovably held in oblique position with respect to each other, converging in direction of the sight apertures to accommodate the distance between the two eyes, and diverging therefrom to provide space for the patient's face between them.

16. In a device of the characted described, separated lens holders having sight apertures, one for each eye, and immovably held in oblique position with respect to each other, converging in direction of the sight apertures to accommodate the distance between the two eyes and diverging therefrom to provide space for the patient's face between them, and means for changing the distance between them to adjust for the distance between the eyes of the patient.

17. In a device of the character described, separated holders for lenses, each having an endless race-way, a series of spherical lenses in the race-way, a sight aperture, means for moving the lenses around the race-way into alinement with the sight aperture, and being immovably held in oblique position with respect to the other, converging in the direction of the sight aperture to accommodate the distance between the eyes, and diverging to provide space for the patient's face between them, and means for changing the distance between them to adjust for the distance between the eyes of the patient.

18. In a device of the character described, a continuous lens race-way, a series of lens cells therein, means for locking the cells together in pairs, two by two, so they will be immovable as respects each member of a pair, but each pair will be free to change its position with respect to other pairs and all the pairs adapted to move along the race-way with the center of the lens cells following the center line of the race-way.

19. In a device of the character described, separated lens race-ways, each side comprising an immovable spherical lens race-way having a sight aperture, a movable cylindrical lens race-way having a sight opening aligned with the sight opening in the spherical lens race-way and pivoted thereabout, said spherical race-ways being fixedly and obliquely set to converge in the direction of the sight apertures, and means for supporting the race-ways.

20. In a device of the character described, separated lens race-ways, each side comprising an immovable spherical lens race-way having a sight aperture, a movable cylindrical lens race-way having a sight opening aligned with the sight opening in the spherical lens race-way and pivoted thereabout, said spherical race-ways being fixedly and obliquely set to converge in the direction of the sight apertures, means for supporting the race-ways, and means for changing the distance between the race-ways.

21. An ophthalmological instrument comprising main and supplemental lens cases, both of elongated form and diagonally disposed, said cases each being provided with sight apertures adjacent their inner ends whereby the inner ends may be presented over the eyes and the cases will extend outwardly away from the face, the supplemental cases being swivelled about the sight apertures as a center, and having cylindrical lenses mounted therein whereby the angle of axis of the cylindrical lenses may be varied as desired by swivelling of the supplemental case.

22. An ophthalmogical instrument comprising a support having a sight aperture and an elongated lens case swivelled for rotation about said aperture, a series of cylindrical lenses contained within the elongated case, and means for presenting the cylindrical lenses before the sight aperture at a given angle to the case whereby swivelling of the case will vary the angle of axis of the cylindrical lenses.

23. An ophthalmological instrument comprising a support having a sight aperture and an elongated lens case swivelled for rotation about said aperture, a series of cylindrical lenses contained within the elongated case, means for presenting the cylindrical lenses before the sight aperture at a given angle to the case whereby swivelling of the case will vary the angle of axis of the cylindrical lenses, and a protractor for indicating the angle to which the supplemental lens case has been swung.

In testimony whereof I have affixed my signature, in presence of two witnesses.

HENRY L. De ZENG.

Witnesses:
SAMUEL W. CAFFERTY,
EDNA McDEVITT.